US00RE38853E

(19) United States
(12) Reissued Patent
Rabinowicz

(10) Patent Number: US RE38,853 E
(45) Date of Reissued Patent: Oct. 25, 2005

(54) SUBSTANTIALLY SEAMLESS BRASSIERE, AND BLANK AND METHOD FOR MAKING SAME

(75) Inventor: Sigi Rabinowicz, Beni-Brak (IL)

(73) Assignee: Alba-Waldensian, Inc., Valdese, NC (US)

(21) Appl. No.: 10/235,048

(22) Filed: Sep. 4, 2002

Related U.S. Patent Documents

Reissue of:
(64) Patent No.: 6,287,168
Issued: Sep. 11, 2001
Appl. No.: 09/593,889
Filed: Jun. 14, 2000

(51) Int. Cl.[7] ..... A41C 3/00
(52) U.S. Cl. ..... 450/75; 450/65; 450/156; 66/71
(58) Field of Search ..... 450/65, 69, 70, 450/72, 73, 75, 76, 156; 66/171, 176, 177, 153, 172 E, 170

(56) References Cited

U.S. PATENT DOCUMENTS

| | | | | | |
|---|---|---|---|---|---|
| 1,863,697 | A | * | 6/1932 | Rutledge | 66/176 |
| 3,537,279 | A | * | 11/1970 | Epley | 66/176 |
| 4,372,322 | A | | 2/1983 | Stern et al. | |
| 4,531,525 | A | * | 7/1985 | Richards | 66/176 X |
| 5,081,854 | A | * | 1/1992 | Lonati | 66/176 |
| 5,479,791 | A | * | 1/1996 | Osborne | 66/171 |
| 5,553,468 | A | * | 9/1996 | Osborne | 66/171 |
| 5,592,836 | A | * | 1/1997 | Schuster et al. | 66/176 |
| 5,660,577 | A | | 8/1997 | Modena | |
| 5,946,944 | A | * | 9/1999 | Osborne | 66/176 |
| 6,000,994 | A | | 12/1999 | Salotto | |
| 6,125,664 | A | * | 10/2000 | Browder, Jr. | 66/176 |

FOREIGN PATENT DOCUMENTS

DE 1920 125 11/1970

* cited by examiner

*Primary Examiner*—Gloria M. Hale
(74) *Attorney, Agent, or Firm*—Alston & Bird LLP

(57) ABSTRACT

A brassiere fashioned from a circularly knit fabric blank has a central panel between the breast cups that has a greater resistance to stretching than the remainder of the body of the brassiere. The brassiere preferably is formed from a blank that is knit to have two pairs of breast cups that are arranged in mirror image about a fold region at which the blank is folded to place one set of breast cups in overlying relationship with the other set of breast cups such that the resulting brassiere is a two-ply structure. The brassiere can be formed in either non-underwire or underwire form. When included, the underwires are attached either to an exterior side of one of the plies, or alternatively between the plies. The blank can be circularly knit as a two-ply tubular structure similar to a long turned welt.

38 Claims, 7 Drawing Sheets

SUBSTANTIALLY SEAMLESS BRASSIERE, AND BLANK AND METHOD FOR MAKING SAME

Matter enclosed in heavy brackets [ ] appears in the original patent but forms no part of this reissue specification; matter printed in italics indicates the additions made by reissue.

FIELD OF THE INVENTION

The present invention relates to brassieres. The invention relates more particularly to substantially seamless brassieres including non-underwire and underwire brassieres, and blanks and methods for making such brassieres.

BACKGROUND OF THE INVENTION

Brassieres are generally designed to provide support, lift, and separation of the wearer's breasts. Conventionally, brassieres for larger-breasted women often include underwires extending along the lower margins of the breast cups. Underwires provide a level of stability that fabric alone generally cannot provide, in part because fabric cannot support compressive forces the way underwires can. Typically, brassieres are fashioned in a cut-and-sew manner, as exemplified for instance in U.S. Pat. No. 4,372,322 issued to Stern et al. A brassiere made in this manner may consist of more than a dozen separate fabric pieces sewn together. One advantage of the cut-and-sew method is that different areas of the brassiere can be given different properties, since the various fabric pieces can be of different knits, different yarns, etc. It may be advantageous, for example, to make some portions of the brassiere resiliently stretchable to hug the wearer's body, while other portions are relatively unstretchable for greater stability.

The cut-and-sew method, however, is disadvantageous in that it entails a great number of cutting and sewing operations. Accordingly, methods of fashioning brassieres from circularly knit fabrics have been developed in an effort to improve the speed and efficiency of production. For example, commonly assigned U.S. Pat. Nos. 5,479,791 and 5,592,836 disclose methods for making non-underwire brassieres from circularly knit tubular blanks. The brassieres are made from single-ply tubular blanks that have a turned welt at one end to form a torso-encircling portion of the brassiere. A series of courses for defining breast cups and front and rear shoulder straps are integrally knit to the turned welt. The brassiere requires sewing only for joining the front and rear shoulder straps to each other. The '836 patent discloses modifying the knit structure along outer edges of the breast cups nearest the wearer's arms to form panels having a greater resistance to coursewise stretching than the remainder of the fabric blank. The relatively unstretchable panels provide increased lift and support.

SUMMARY OF THE INVENTION

The present invention provides a substantially seamless brassiere and a blank and method for making the same. In preferred embodiments, the brassiere has a gusset or central panel between the breast cups that has a greater resistance to stretching than the remainder of the body of the brassiere. The central panel provides stability by preventing the cups from undergoing excessive movement relative to each other, while the rest of the brassiere is resiliently stretchable for comfort and for closely hugging the body.

In other preferred embodiments, the brassiere is formed from a blank that is knit to have two pairs of breast cups that are arranged in mirror image about a fold region at which the blank is folded to place one set of breast cups in overlying relationship with the other set of breast cups. Thus, the resulting brassiere is a two-ply structure. The brassiere can be formed in either non-underwire or underwire form. When included, the underwires are attached either to an exterior side of one of the plies, or alternatively between the plies.

Preferably, the blank has a relatively thin region that defines the line about which the blank is folded. For example, the blank can be knit from a plurality of yarns of different deniers, and the heavier yarns can be dropped for a plurality of courses such that only the lighter yarns are knit for those courses. The thin region facilitates a sharp fold. The blank preferably also has a turned welt at each end to prevent raveling of the ends of the tube and to facilitate handling of the blank.

The two-ply construction of the brassiere can also be accomplished by circularly knitting both plies in overlying relation, essentially forming a fabric tube as one long turned welt. This construction enables the two turned welts at the ends of the tube to be eliminated, and the blank is already in a two-ply configuration when it comes off the knitting machine, resulting in a more-efficient manufacturing process.

The blank, whether knit as one ply and then folded or knit as a two-ply structure, preferably defines a relatively unstretchable gusset or central panel between the breast cup panels of each ply. A separate, relatively unstretchable piece of fabric can be affixed between the plies in the region of the central panels to increase the resistance to stretching of the panel, if desired. Furthermore, an adhesive can be disposed between the plies in the gusset region to provide additional stability to the fabric.

The greater resistance to stretching in the central panel can be achieved in various ways, as noted above. In a preferred embodiment, a float stitch construction is used and an additional yarn is spliced in throughout the region of the central panel.

The brassiere can be formed with integrally knit shoulder straps, or alternatively can have separate shoulder straps that are sewn to the brassiere. The torso-encircling portion of the brassiere can be formed as a single continuous panel that extends from one breast cup around the wearer's back to the other breast cup, or alternatively can be formed in two halves that have fastener members such as hooks and eyes for releasably securing the ends of the two halves together. The brassiere can also be formed as a single-ply construction if desired.

BRIEF DESCRIPTION OF THE DRAWINGS

The above and other objects, features, and advantages of the invention will become more apparent from the following description of certain preferred embodiments thereof, when taken in conjunction with the accompanying drawings in which.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
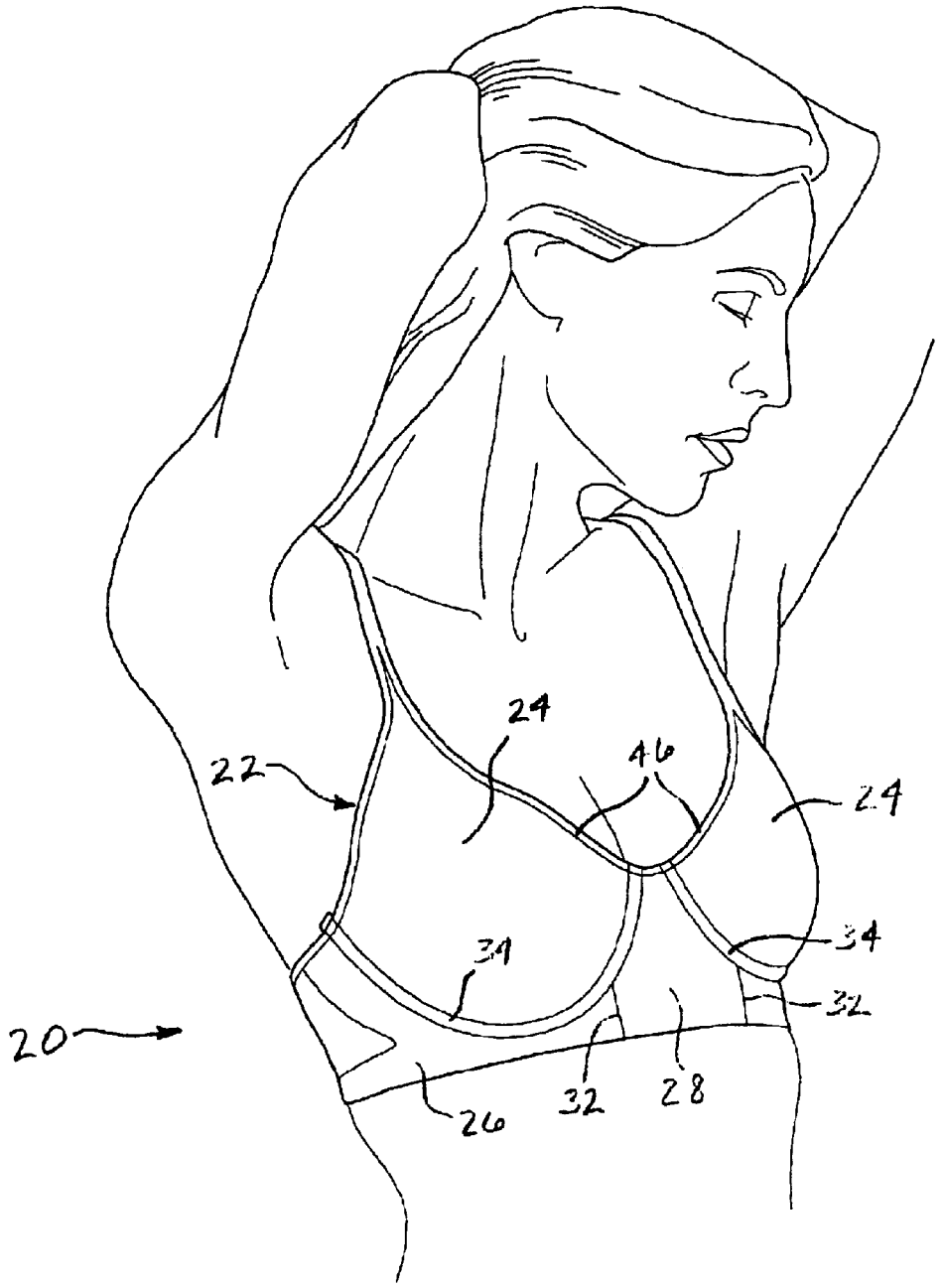
FIG. 1 is a perspective view showing a person wearing a substantially seamless underwire brassiere in accordance with a preferred embodiment of the invention.
Figure 6:
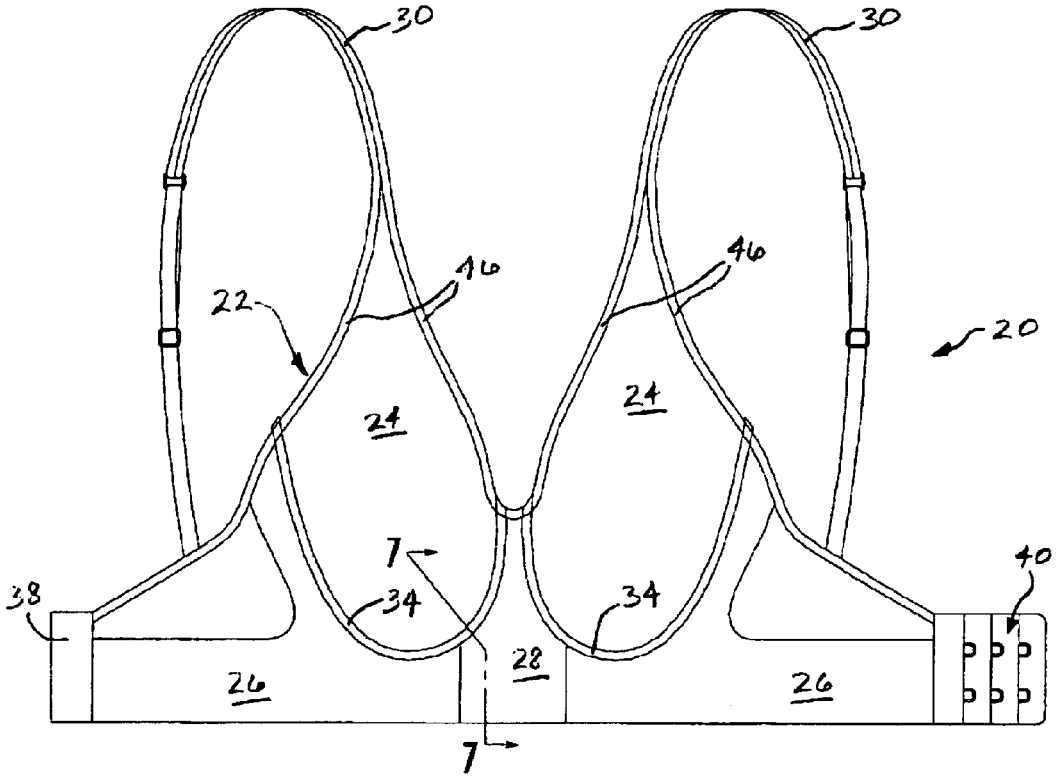
FIG. 6 is a plan view of a finished brassiere produced from the folded blank of FIG. 5.

With reference to FIGS. 1 and 6, a substantially seamless underwire brassiere in accordance with a first preferred embodiment of the invention is broadly designated by reference numeral 20. The brassiere 20 includes a body-covering portion 22 comprising a pair of breast cups 24, a torso-encircling portion 26, and a gusset or central panel 28. The brassiere also includes a pair of shoulder straps 30 attached to the body-covering portion 22.

The breast cups 24 and torso-encircling portion 26 have a knit structure that makes them resiliently stretchable vertically and horizontally. The breast cups 24 and torso-encircling portion 26 can be knit, for example, from various types of face yarns depending on the desired properties of the fabric, and the face yarns can be of various deniers, the selection of the face yarns and the knit depending primarily on the desired characteristics of the fabric such as the hand, appearance, texture, etc. The breast cups 24 and torso-encircling portion 26 preferably also incorporate elastomeric yarns such as spandex (bare and/or covered) or the like so as to impart resiliency to the fabric.

The gusset or central panel 28 extends between the breast cups 24 and has laterally outer edges 32 that preferably are located generally beneath the breast cups 24. The central panel 28 preferably has a different knit structure from that of the breast cups and torso-encircling portion of the brassiere so as to give the central panel a greater resistance to stretching than the breast cups and torso-encircling portion. To achieve the greater resistance to stretching, the central panel 28 can be knit from different yarns and/or can have a different configuration of stitch loops from that of the breast cups and torso-encircling portion. For example, the central panel can be knit with a float stitch construction having an additional spliced-in yarn for those courses corresponding to the location of the central panel. The central panel 28 preferably has a greater resistance to stretching both vertically and horizontally compared to the stretchability of the breast cups and torso-encircling portion of the brassiere. Accordingly, the central panel provides stability by preventing excessive movement of the breast cups relative to each other.

The brassiere 20 also includes an underwire 34 (best seen in FIG. 7) sewn to each breast cup for providing further lift, support, and separation. Each underwire 34 is encased in a fabric casing 36 and the casing is sewn to the respective breast cup, as further described below.

The brassiere 20 has the torso-encircling portion 26 formed in two halves comprising one lateral panel having one end attached to one of the breast cups 24 and to one edge of the central panel 28, and another lateral panel having one end attached to the other breast cup and to the other edge of the central panel. The free end of one of the halves of the torso-encircling portion has fastener members 38, such as hooks, attached to it, and the free end of the other half of the torso-encircling portion has cooperative fastener members 40, such as eyes, attached to it for engagement with the opposite fastener members 38 so that the brassiere can be engaged about the torso of a wearer.

Figure 7:
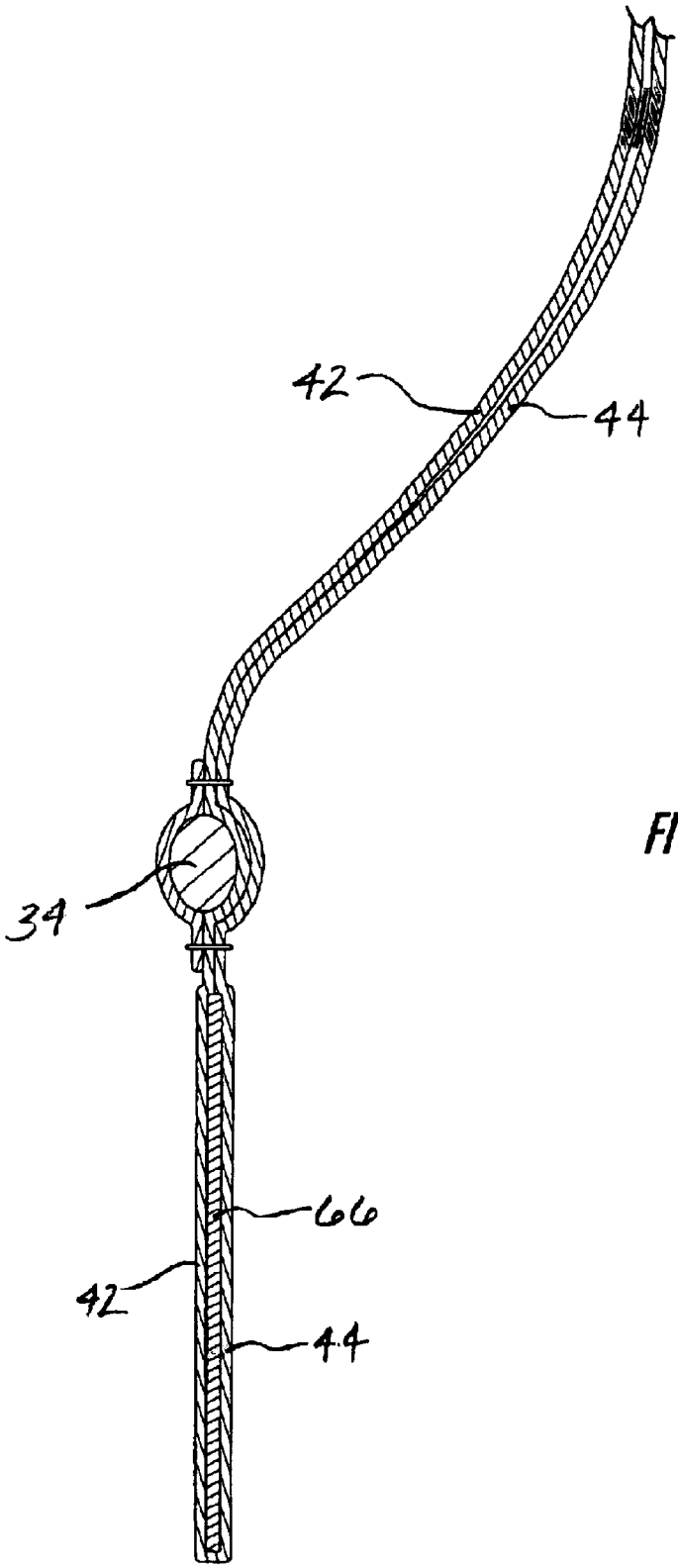
FIG. 7 is a cross-sectional view taken on line 7—7 of FIG. 6 through one breast cup and the central panel, illustrating an alternative embodiment of the invention having an additional substantially nonstretchable fabric piece secured between the plies of the central panel.

The brassiere 20 in accordance with the first preferred embodiment of the invention has a two-ply construction as best seen in the cross-sectional view of FIG. 7. More particularly, the breast cups 24, torso-encircling portion 26, and central panel 28 are all formed from a single continuous piece of fabric that is folded upon itself to define an inner ply 42 that faces the wearer's body and an outer ply 44 that faces outward. The two plies are affixed to each other along the peripheral edges of the breast cups and torso-encircling portion, preferably by sewing elastic banding 46 along these edges.

Figure 2:
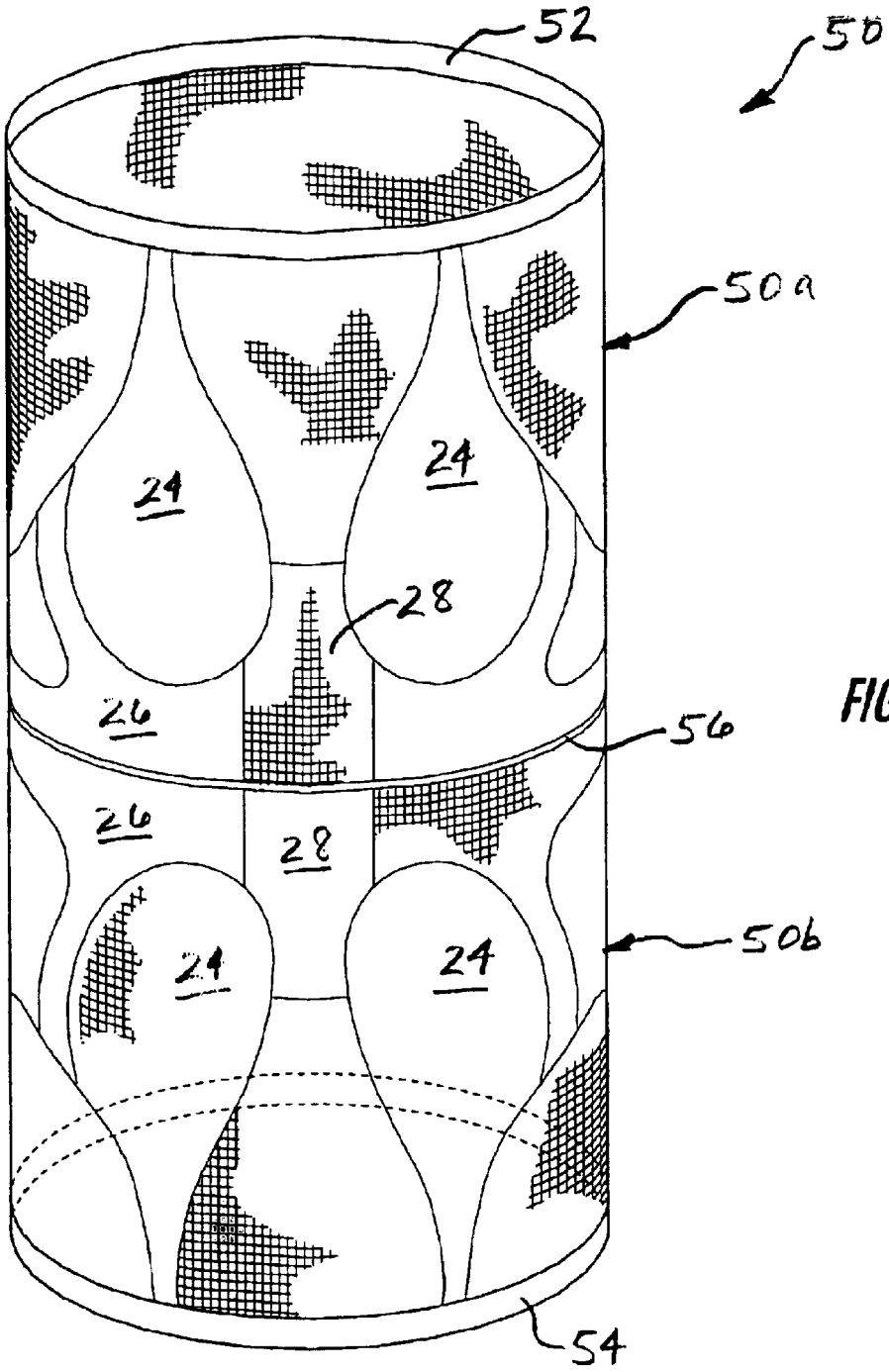
FIG. 2 is a perspective view of a circularly knit fabric tube for making a brassiere, in accordance with one preferred embodiment of the invention.

The brassiere 20 is fabricated from a circularly knit fabric tube 50 depicted in FIG. 2. The tube 50 preferably has a turned welt 52 formed at one end and another turned welt 54 at the other end to prevent the tube from raveling and to facilitate handling of the fabric in subsequent fabrication processes as described below. Knitting of the tube 50 begins by knitting the turned welt 52. A first series of courses is then knit to the turned welt 52 so as to form a first tubular structure 50a defining panels 24 for forming breast cups, a tubular torso-encircling portion 26, and a central panel 28 between the breast cup panels 24. The first series of courses terminates at a fold region 56 that will define the lowermost edge of the finished brassiere. Preferably, the fold region 56 is knit to be thinner than the rest of the fabric tube, which can be accomplished, for example, by dropping the heavier yarns for a few courses (e.g., for about 8 courses) such that only the lighter yarns are knit for those courses. Next, a second series of courses is knit to the end of the first series of courses so as to form a second tubular structure 50b forming an extension of the first tubular structure 50a. The second tubular structure 50b defines breast cup panels 24, a torso-encircling portion 26, and a central panel 28 arranged in mirror image to the corresponding features of the first tubular structure about the fold region 56. At the end of the second series of courses, the turned welt 54 is knit, and the fabric tube 50 is then taken off the circular knitting machine.

By folding the fabric tube 50 about the fold region 56, the second tubular structure 50b can be positioned in overlying relation to the first tubular structure 50a so that the breast cup panels, torso-encircling portions, and central panels of the two tubular structures are overlying and in registration with each other. If it is desired to fabricate a brassiere having a single continuous torso-encircling portion 26 (i.e., such that the wearer dons the brassiere by slipping it over the head and onto the torso), the folded fabric tube 50 can then be cut along sew lines defining the outlines of the breast cup panels 24 and the torso-encircling portion 26; preferably, the cutting is performed in a sewing machine that also simultaneously sews decorative and/or elastic banding along the cut edges of the inner and outer plies of the folded fabric tube so as to stitch the edges of the two plies together and create a finished edge of the brassiere.

Figure 3:
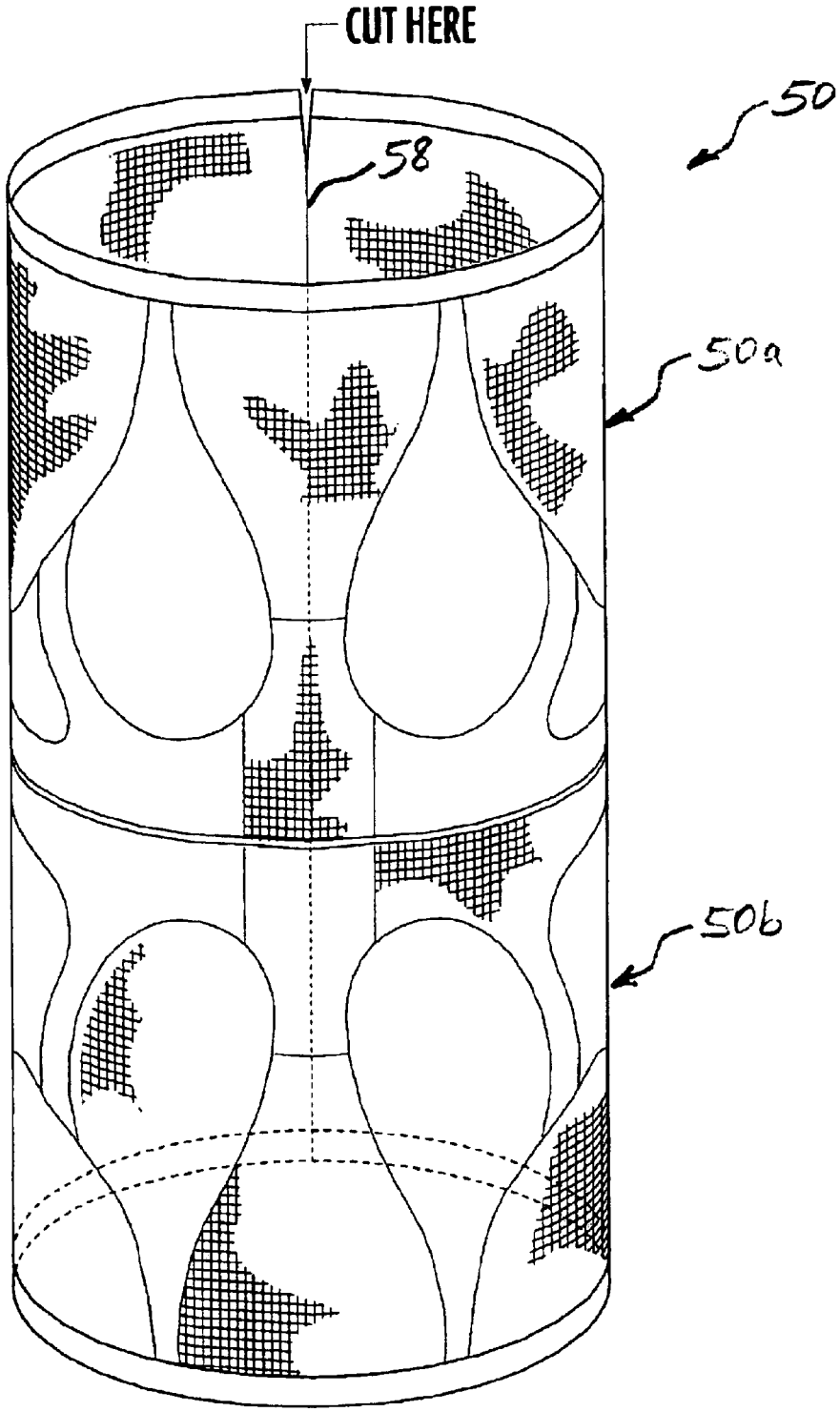
FIG. 3 is a view similar to FIG. 2, showing the blank being slit along a longitudinal line for flattening the blank.
Figure 4:
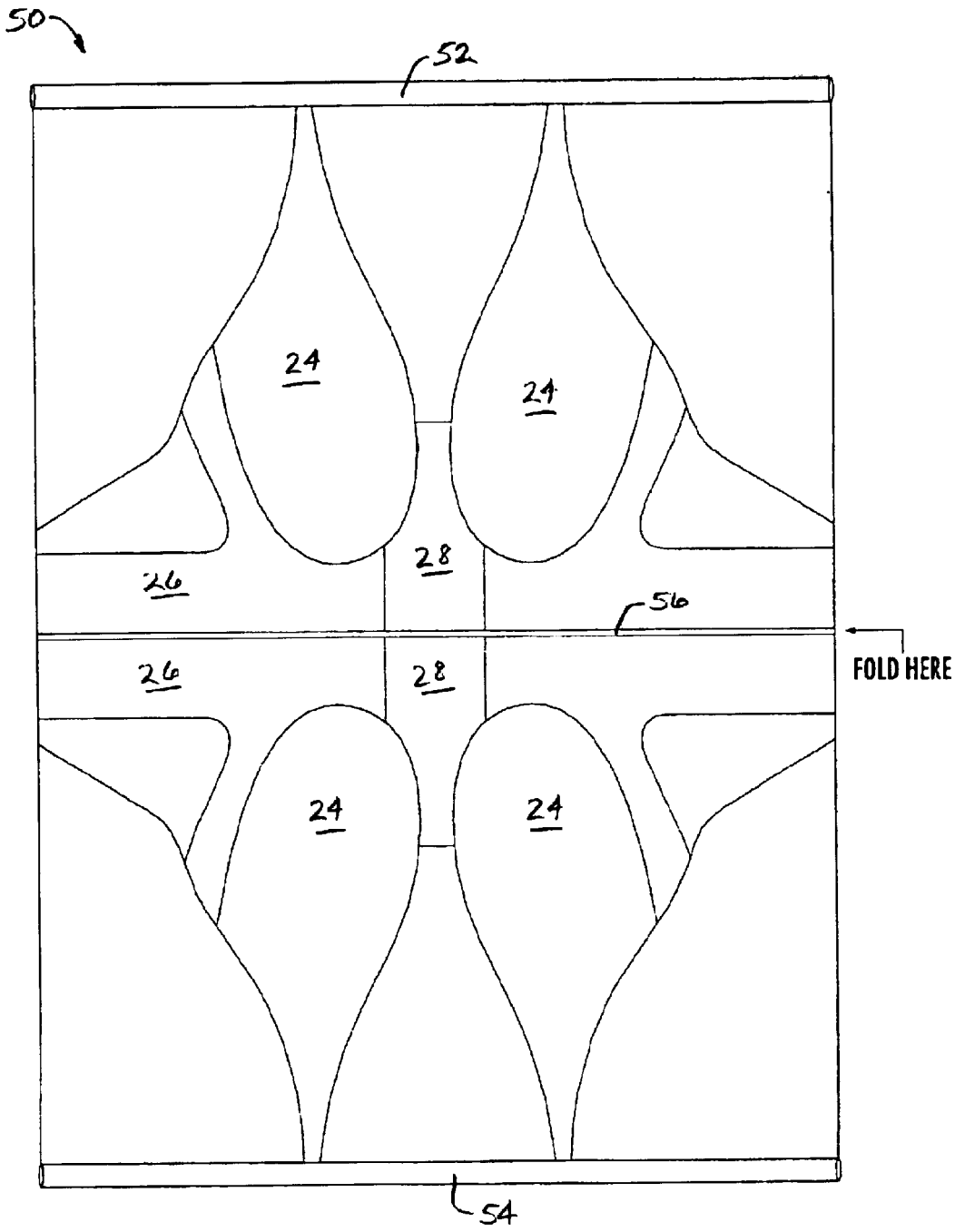
FIG. 4 is a plan view of the fabric tube of FIG. 3 after the tube has been slit and opened up into a flat configuration.
Figure 5:
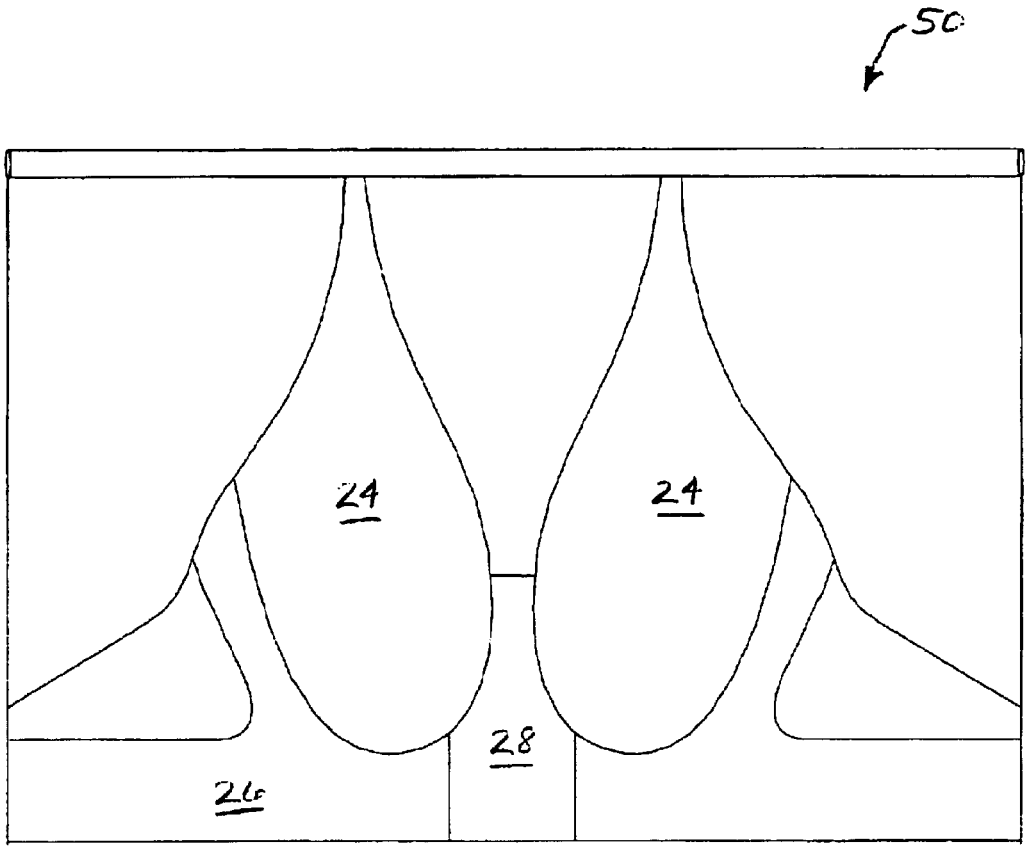
FIG. 5 is a plan view of the flattened blank of FIG. 4 after the blank has been folded about the line of symmetry.

Alternatively, the fabric tube 50 can be slit along a longitudinal line 58 located generally diametrically opposite from the central panels 28 as shown in FIG. 3, and the slit tube can be opened up into a flat configuration as depicted in FIG. 4. The resulting flat blank can then be folded about the fold region 56 to create the two-ply structure shown in FIG. 5, and then the cutting and application of banding can be performed. In this case, the torso-encircling portion 26 is formed in two halves and fastener members 38, 40 are attached to the ends of the two halves as with the brassiere 20 of FIG. 1. This fabrication method enables the girth of the torso-encircling portion to be reduced from the full girth of the fabric tube 50, if desired.

The flat fabric blank of FIG. 4 can be boarded, if desired, to make it lay flat and to take out wrinkles. The turned welts 52, 54 can facilitate handling the blank during the boarding and other processes, and also prevent the edges of the blank from curling and raveling.

Preferably, the breast cups 24 are molded after the fabric tube 50 is slit and flattened and folded about the fold region 56, so that the breast cups are shaped with a desired contour. To this end, the fabric at least in the breast cup regions includes a heat-settable yarn. Molding can be performed on a conventional molding device, which generally includes a heated convex form and a frame that stretches the fabric over the form so that the heat-settable yarn is softened while in the stretched condition, after which the fabric is removed from the form and the heat-settable yarn cools so as to permanently retain the contoured shape of the breast cup. Preferably, the fabric blank is folded about the fold region 56 prior to molding so that both plies of each breast cup are molded simultaneously. If desired, the blank can be folded a second time to place one two-ply breast cup over the other two-ply breast cup prior to molding so that both cups are molded simultaneously.

Where the brassiere to be fabricated is to be an underwire brassiere, the underwires 34 can be sewn to the side of the inner ply 42 that faces the wearer's body, as shown in FIG. 7. Alternatively, the underwires 34 can be disposed between the inner ply 42 and the outer ply 44 and can be sewn to either or both of the plies. When the underwires are disposed between the plies, preferably the underwires are sewn to the inner ply 42 after molding of the cups, and then the blank is folded and the cutting and application of banding is performed.

It will be recognized, however, that the present invention is not limited to underwire brassieres. Non-underwire brassieres can be made using the blanks and methods of the invention, and the process is generally the same except that the step of sewing the underwires to the cups is omitted.

Furthermore, it will be recognized that while the brassiere 20 illustrated in FIG. 1 has separate shoulder straps 30 that are sewn to the body-covering portion 22 of the brassiere, it is also possible to integrally knit the shoulder straps to the body-covering portion during the circular knitting process. The construction of a brassiere with such integrally knit shoulder straps is described in U.S. Pat. No. 5,592,836, the disclosure of which is incorporated herein by reference. In this embodiment (not shown), the fabric tube has sufficient length on either end to allow front and rear shoulder straps to be cut out. After the blank is folded about the fold region 56 and the cutting and application of banding is performed along the peripheral edges of the brassiere including the edges of the shoulder straps, the front shoulder straps are sewn to the rear shoulder straps. Various configurations of shoulder straps can be formed. Where both ends of the fabric tube define shoulder strap panels, the resulting shoulder straps will have two plies just as the remainder of the brassiere. If desired, single-ply shoulder straps can be formed by knitting only one end of the tube (preferably the end that defines the outer ply of the brassiere) to have shoulder strap panels.

Another embodiment of the invention is shown in FIG. 7. While a greater resistance to stretching of the central panel 28 can be achieved by altering the knit structure of the panel, if still greater resistance to stretching is desired, it is possible to affix a substantially unstretchable piece of fabric 66 to one or both of the plies of the central panel 28, such as by sewing or by adhesively joining the fabric piece to the ply or plies. For instance, a tricot fabric or the like can be used for the purpose.

The present invention can also be applied to the construction of single-ply brassieres. Unlike the previously described embodiments, to make a single-ply brassiere, a fabric tube (not shown) is constructed having a turned welt at the top end and a turned welt at the bottom end, but between the two turned welts the tube defines only one set of breast cup panels 24, one torso-encircling portion 26, and one central panel 28. The central panel 28, as previously described, preferably has a greater resistance to stretching than the rest of the fabric tube. The bottom welt is advantageous in that it provides a finished bottom edge for the resulting brassiere fabricated from the fabric tube. However, the bottom welt can be omitted, if desired, and the bottom edge of the brassiere can be finished by applying banding thereto just as along the other edges of the brassiere. Furthermore, the top welt can be omitted. The fabric tube can be slit along a longitudinal line prior to the step of cutting and applying banding, or alternatively the cutting and application of banding can be performed without slitting the tube where it is desired to produce a continuous tubular brassiere.

It is also possible to fabricate a two-ply brassiere by circularly knitting a two-ply fabric tube. The tube is essentially knit as one long turned welt by knitting a first series of courses that will become the outer ply of the brassiere, and knitting a second series of courses that will become the inner ply of the brassiere. For example, the tube can be knit on a circular knitting machine having cylinder needles and dial needles, the cylinder needles being used to knit the first series of courses and the dial needles being used to knit the second series of courses. The knitting of two-ply tubes is a process known to those of skill in the art, and hence is not further described herein. By knitting the tube as a two-ply structure, the tube does not require turned welts at the ends such as included with the previously described one-ply tube, and the blank comes off the knitting machine as a two-ply structure so that the step of folding the blank is eliminated.

Many modifications and other embodiments of the invention will come to mind to one skilled in the art to which this invention pertains having the benefit of the teachings presented in the foregoing descriptions and the associated drawings. For example, while the illustrated and described two-ply brassieres and blanks have defined breast cup panels and central panels in both plies, it is within the scope of the invention to provide only one of the plies with defined breast cup panels and/or central panel. Thus, for instance, the central panel defined in one ply may have sufficient resistance to stretching such that the other ply does not require a similarly unstretchable central panel. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A substantially seamless brassiere, comprising:

a body-covering portion *constructed from a circularly knit fabric tube having circumferentially extending courses running in a coursewise direction of the fabric tube, wherein the fabric is manipulated into a two-ply structure and operated upon to form said body-covering portion having an inner ply and an outer ply integrally knit to each other at a bottom edge of the body-covering portion, said body-covering portion* defining a pair of breast cups *spaced apart in said coursewise direction*, a central panel integrally knit to and extending between the breast cups, and a torso-encircling portion integrally knit to outer edges of the central panel and to the breast cups; and a pair of shoulder straps attached to the body-covering portion;

wherein the breast cups and the torso-encircling portion are resiliently stretchable, and the central panel has a greater resistance to stretching than the breast cups and torso-encircling portion.

2. The brassiere of claim 1, wherein *the inner and outer plies of* the body-covering portion [is formed of a circularly knit fabric blank folded upon itself] *are connected to each other* along a fold line defining [a] *said* bottom edge of the body-covering portion[, whereby the body-covering portion has an inner ply that faces a wearer's body and an outer ply that faces outward].

3. The brassiere of claim 2, further comprising underwires sewn to the breast cups.

4. The brassiere of claim 3, wherein the underwires are disposed against an exterior side of one of the inner and outer plies of the body-covering portion.

5. The brassiere of claim 3, wherein the underwires are disposed between the inner and outer plies of the body-covering portion.

6. The brassiere of claim [2] *1*, wherein the torso-encircling portion comprises a pair of lateral panels each having one end integrally knit to one of the breast cups and to the respective outer edge of the central panel and having an opposite free end, the free ends of the lateral panels having cooperative fastener members attached thereto for releasably securing the free ends to each other.

7. The brassiere of claim [2] *1*, wherein the body-covering portion comprises a continuous tubular structure such that the torso-encircling portion comprises a single continuous panel.

8. The brassiere of claim [2] *1*, further comprising a substantially unstretchable fabric layer disposed between the inner and outer plies in the vicinity of the central panel and affixed to at least one of the plies for increasing the resistance to stretching of the central panel.

9. The brassiere of claim [2] *1*, wherein the central panel achieves the greater resistance to stretching than the breast cups and torso-encircling portion by a different knit construction of the central panel relative to that of the breast cups and torso-encircling portion.

10. The brassiere of claim 2, wherein the [circularly knit fabric blank] *body-covering portion* has a fold region defining the fold line [along which the blank is folded to define the bottom edge of the body-covering portion], the fold region being thinner than the rest of the [blank] *body-covering portion* to facilitate folding.

11. A blank for making a substantially seamless brassiere, comprising a fabric structure having:

a first series of courses defining a first pair of breast cup panels and a first central panel integrally knit to and extending between the breast cup panels, and defining a first torso-encircling portion integrally knit to the first breast cups and to the first central panel, the first series of courses beginning at a first end of the fabric structure and progressing toward an opposite second end of the fabric structure, an end of the first series of courses defining a bottom edge of the first torso-encircling portion; and a second series of courses knit to the end of the first series of courses and progressing to the second end of the fabric structure, the second series of courses defining a second pair of breast cups and a second central panel and a second torso-encircling portion arranged in mirror image to the corresponding portions of the first series of courses, whereby the fabric structure can be folded about a fold line located at the juncture between the first and second series of courses to create a two-ply structure having the first breast cups, first central panel, and first torso-encircling portion overlying the second breast cups, second central panel, and second torso-encircling portion, respectively.

12. The blank of claim 11, wherein the fabric structure comprises a circularly knit fabric tube.

13. The blank of claim 12, wherein the fabric tube further comprises a turned welt knit at each end of the tube.

14. The blank of claim 11, wherein the fabric structure comprises a flat piece of fabric.

15. The blank of claim 11, wherein the breast cup panels and the torso-encircling portions are resiliently stretchable, and the central panels are more resistant to stretching than the breast cup panels and torso-encircling portions.

16. The blank of claim 15, wherein the greater resistance to stretching of the central panels is achieved by a different knit construction of the central panels relative to that of the breast cup panels and torso-encircling portions.

17. A method for making a body-covering portion of a substantially seamless brassiere, comprising:

knitting a tubular blank by:

circularly knitting a first series of courses to form a first tubular structure, wherein a portion of the first tubular structure is knit to be less stretchable than the remainder of the first tubular structure and is shaped as a central panel having opposite side edges knit to two circumferentially spaced portions of the first tubular structure that will form breast cups; and circularly knitting a second series of courses to an end of the first series of courses to form a second tubular structure as an extension of the first tubular structure, wherein the second tubular structure also includes a central panel knit to be less stretchable than the remainder of the second tubular structure and shaped similarly to and positioned in mirror image to the central panel of the first tubular structure about a juncture between the first and second series of courses;

folding the blank about the juncture between the first and second series of courses such that the first tubular structure overlies the second tubular structure and the central panels are in registration with each other, so as to form a two-ply blank;

cutting the two-ply blank along cut lines to define breast cups and a torso-encircling portion; and stitching peripheral edges of the two plies of the breast cups and torso-encircling portion together.

18. The method of claim 17, wherein the central panels are knit with a different knit structure relative to that of the breast cup panels and torso-encircling portion such that the central panels have a greater resistance to stretching than the breast cup panels and torso-encircling portion.

19. The method of claim 17, further comprising sewing underwires to an exterior side of one of the plies.

20. The method of claim 17, further comprising sewing underwires between the plies.

21. The method of claim 17, wherein a plurality of courses are knit at the juncture between the first and second series of courses so as to form a region that is relatively thin compared to the remainder of the blank to facilitate folding the blank at the juncture.

22. The method of claim 17, further comprising slitting the tubular blank along a longitudinal line located generally diametrically opposite from the central panels and opening up the tubular blank into a flat configuration, whereby the torso-encircling portion of the brassiere is formed in two halves each having one end joined to one of the breast cups and an opposite free end, and further comprising attaching cooperative fastener members to the free ends of the two halves of the torso-encircling portion.

23. The method of claim 17, wherein the brassiere is knit with a heat-settable yarn, and further comprising heating and molding the breast cups.

24. The method of claim 17, further comprising affixing a substantially unstretchable fabric piece to at least one of the central panels.

25. A blank for making a substantially seamless brassiere, comprising:

a tubular two-ply fabric structure having a first series of courses defining a first tubular fabric ply and a second series of courses knit to one end of the first series of courses so as to define a second tubular fabric ply in overlying relationship with the first tubular fabric ply, at least one of the plies having a pair of defined breast cup panels, a central panel extending between the breast cup panels, and a torso-encircling portion, and wherein the central panel is knit to have a greater resistance to stretching than the breast cup panels and torso-encircling portion.

26. The blank of claim 25, wherein the two-ply fabric structure comprises a long turned welt produced on a circular knitting machine.

27. The blank of claim 25, wherein the two-ply fabric structure comprises a single-ply fabric tube produced on a circular knitting machine and subsequently folded to form the two-ply structure.

*28. A substantially seamless brassiere, comprising:*

*a body-covering portion constructed from a circularly knit fabric tube having circumferentially extending courses running in a coursewise direction of the fabric tube, wherein the fabric is manipulated into a two-ply structure and operated upon to form said body-covering portion having an inner ply and an outer ply integrally knit to each other at a bottom edge of the body-covering portion, said body-covering portion defining a pair of cups spaced apart in said coursewise direction and a torso-encircling portion integrally knit to the cups; and*

*a pair of shoulder straps attached to the body-covering portion.*

*29. The substantially seamless brassiere of claim 28, further comprising a central panel between the cups integrally knit thereto, the central panel having a greater resistance to stretching than the cups and torso-encircling portion.*

*30. The substantially seamless brassiere of claim 29, wherein the central panel includes an additional piece of fabric disposed between the inner and outer plies and affixed to at least one of the plies, the additional piece of fabric being substantially unstretchable so as to impart said greater resistance to stretching of the central panel.*

*31. The substantially seamless brassiere of claim 28, further comprising underwires affixed to the cups.*

*32. The substantially seamless brassiere of claim 31, wherein the underwires are disposed between the inner and outer plies.*

*33. A method for making a substantially seamless brassiere, comprising the steps of:*

*circularly knitting a fabric tube inner ply having a series of courses extending circumferentially in a coursewise direction of the fabric tube, the inner ply defining a pair of cups spaced apart in the coursewise direction;*

*circularly knitting a fabric tube outer ply having a series of courses extending circumferentially in a coursewise direction of the fabric tube, the outer ply defining a pair of cups spaced apart in the coursewise direction, and the outer ply being integrally knit to one end of the inner ply;*

*manipulating the inner and outer plies to position the plies in overlying relation with the cups of the inner ply aligned with the cups of the outer ply so as to provide a two-ply fabric structure; and*

*fashioning said substantially seamless brassiere from said two-ply fabric structure such that the brassiere has two plies internally knit together at a lower edge of the brassiere.*

*34. The method of claim 33, wherein the fabric tube inner and outer plies are knit on a circular knitting machine as a continuous single-ply fabric tube, and the manipulating step is performed after removing the single-ply fabric tube from the knitting machine.*

*35. The method of claim 33, wherein the fabric tube inner and outer plies are knit on a circular knitting machine and the manipulating step is performed by the knitting machine so as to produce a two-ply fabric tube from which said two-ply fabric structure is made.*

*36. The method of claim 33, wherein the fashioning step includes cutting the two-ply fabric structure along cut lines and attaching trim to the two-ply fabric structure along the cut lines.*

*37. The method of claim 33, wherein the fashioning step includes affixing a piece of substantially unstretchable fabric between the two plies of the brassiere in a central region between the cups so as to render said central region substantially less stretchable than the rest of the brassiere.*

*38. The method of claim 33, wherein at least one of the inner and outer plies is knit to have a greater resistance to stretching in a central region between the cups than in the rest of the brassiere.*

* * * * *